US011101511B2

(12) United States Patent
Solis Herrera (10) Patent No.: US 11,101,511 B2
(45) Date of Patent: Aug. 24, 2021

(54) SOLID-STATE MELANIN BATTERY

(71) Applicant: Arturo Solis Herrera, Aguascalientes (MX)

(72) Inventor: Arturo Solis Herrera, Aguascalientes (MX)

( * ) Notice: Subject to any disclaimer, the term of this patent is extended or adjusted under 35 U.S.C. 154(b) by 46 days.

(21) Appl. No.: 16/500,088

(22) PCT Filed: Mar. 23, 2018

(86) PCT No.: PCT/IB2018/051992
§ 371 (c)(1),
(2) Date: Oct. 1, 2019

(87) PCT Pub. No.: WO2018/189606
PCT Pub. Date: Oct. 18, 2018

(65) Prior Publication Data

US 2021/0013567 A1     Jan. 14, 2021

Related U.S. Application Data

(60) Provisional application No. 62/483,630, filed on Apr. 10, 2017.

(51) Int. Cl.
*H01M 14/00*     (2006.01)

(52) U.S. Cl.
CPC ................. *H01M 14/005* (2013.01)

(58) Field of Classification Search
CPC ......... H01M 14/005; H01M 4/60; H01M 6/18
See application file for complete search history.

(56) References Cited

U.S. PATENT DOCUMENTS

| 4,366,216 | A | 12/1982 | McGinness | |
|---|---|---|---|---|
| 8,455,145 | B2 | 6/2013 | Solis Herrera | |
| 2004/0231719 | A1 | 11/2004 | Meredith | |
| 2006/0057433 | A1* | 3/2006 | Ando | H01M 10/052 429/9 |
| 2009/0004568 | A1* | 1/2009 | Hirose | H01M 4/362 429/221 |
| 2011/0244345 | A1* | 10/2011 | Solis Herrera | H01M 14/005 429/422 |

(Continued)

FOREIGN PATENT DOCUMENTS

| JP | 2005505107 A | 2/2005 |
|---|---|---|
| JP | 2007188747 A | 7/2007 |

(Continued)

OTHER PUBLICATIONS

International Search Report and Written Opinion dated Dec. 4, 2018 in International Application No. PCT/IB2018/051992.

(Continued)

*Primary Examiner* — Stewart A Fraser
(74) *Attorney, Agent, or Firm* — Panitch Schwarze Belisario & Nadel LLP (57) ABSTRACT

A solid-state battery is provided. The battery includes a melanin structure formed of at least one melanin material embedded in an inert material, and first and second metal bands which serve as first and second electrodes, respectively. The melanin material is selected from the group consisting of melanin, melanin precursors, melanin derivatives, melanin analogs and melanin variants. The solid-state battery does not need to be recharged or reloaded.

15 Claims, 5 Drawing Sheets

(56) References Cited

U.S. PATENT DOCUMENTS

2014/0085022 A1\* 3/2014 Wilde .................. H01F 41/0253
                                                      335/302
2016/0049262 A1\* 2/2016 Bettinger ............... H01G 11/48
                                                      429/213
2016/0329712 A1\* 11/2016 Upreti ..................... H02J 3/381

FOREIGN PATENT DOCUMENTS

| JP | 2008543702 A | 12/2008 |
|---|---|---|
| RU | 2485635 C2 | 6/2013 |
| RU | 2510547 C2 | 3/2014 |
| WO | 2015030052 A1 | 3/2015 |

OTHER PUBLICATIONS

Decision on Grant dated Apr. 14, 2020 in RU Application No. 2019135857/07.
Search Report dated Apr. 13, 2020 in RU 2019135857/07.
Extended European Search Report dated Dec. 15, 2020 in EP Application No. 18783710.9.
Office Action dated Jan. 25, 2021 in CA Application No. 3,058,862.
Office Action dated Feb. 1, 2021 in JP Application No. 2020504462.

\* cited by examiner

SOLID-STATE MELANIN BATTERY

CROSS REFERENCE TO RELATED APPLICATIONS

This application is a Section 371 of International Application No. PCT/IB 2018/051992, filed on Mar. 23, 2018, which was published in the English language on Oct. 18, 2018 under International Publication No. WO 2018/189606 A1, which claims priority to U.S. Provisional Application No. 62/483,630, filed on Apr. 10, 2017, the disclosures of which are incorporated herein by reference in their entireties.

BACKGROUND OF THE INVENTION

Embodiments of the present invention relate to a battery that does require reloading or recharging by a power source, and more particularly a battery that is obtains the requisite energy from the surrounding light (visible and invisible) and transforms this light energy into chemical energy by dissociation and back-bonding of the water molecule.

A major problem in today's energy field is that batteries, whether primary or secondary, for energizing mobile applications can cause pollution to the environment. Also, such conventional batteries must be recharged by being connected to a power source.

The voltaic pile, invented by Alessandro Volta in 1800, was the first electric battery; i.e., the first practical method of generating electricity. The voltaic pile is constructed of alternating metal discs of zinc and cooper with pieces of cardboard soaked in brine between the metal discs, resulting in the generation of a steady current of electricity.

As knowledge advanced, more diverse types of batteries were created. In 1836, Daniel Cell invented the Daniel cell which uses two electrolytes: cooper sulfate and zinc sulfate. The Daniel cell battery, which produce about 1.1 volts, was used to power objects such as telegraphs, telephones, and doorbells. The Daniel cell battery remained popular in homes for over 100 years.

In 1839, William Robert Grove developed the first fuel cell, which produced electrical current by combining hydrogen and oxygen.

The French inventor, Gaston Plante, developed the first practical storage acid battery that could be recharged (i.e., a secondary battery). This type of battery is primarily used in cars today.

The French engineer, Georges Leclanche patented the carbon-zinc wet cell battery called the Leclanche cell. The original Leclanche cell was assembled in a porous pot, with a positive electrode formed of crushed manganese dioxide admixed with a small amount of carbon and a negative electrode formed of a zinc rod inserted into the packed material of the positive electrode to act as a currency collector. The anode or zinc rod and the pot were then immersed in an ammonium chloride solution. The ammonium chloride solution served as an electrolyte. Georges Leclanche then further improved his design by substituting the ammonium chloride paste solution for a liquid electrolyte, and invented a method of sealing the battery, thereby inventing the first dry cell, an improved design that was now transportable.

In 1881, J. A. Thiebaut patented the first battery with both the negative electrode and porous pot placed in a zinc cup.

Also in 1881, Carl Gassner invented the first commercially successful dry cell battery (zinc-carbon cell).

In 1889, Waldmar Jungner invented the first nickel-cadmium rechargeable battery.

In 1901, Thomas Alva Edison invented the alkaline storage battery. Thomas Edison's alkaline cell included iron as the anode material and nickelic oxide as the cathode material.

In 1949, Lew Urry developed the small alkaline-manganese battery. Alkaline batteries last five to eight times as long as their predecessors, zinc-carbon cells.

In 1954, Gerald Pearson, Calvin Fuller and Daryl Chapin invented the first solar battery. A solar battery converts the sun's energy to electricity. The inventors created an array of several strips of silicon (each about the size of a razorblade), placed them in sunlight, captured the free electrons and turned them into electrical current. This became known as the Bell solar battery. The first public service trial of the Bell solar battery began with a telephone carrier system on Oct. 4, 1955.

In general terms, a battery (which is an electric cell) is a device that produces electricity from a chemical reaction. Strictly speaking, a battery consists of two or more cells connected in series or parallel, but the term is generally used for a single cell. A cell consists of a negative electrode, a positive electrode, a separator (also known as an ion conductor) and an electrolyte which conducts ions. The electrolyte may be aqueous (i.e., composed of water) or non-aqueous, and may be in the form of a liquid, paste, or solid. When the cell is connected to an external load, or a device to be powered, the negative electrode supplies a current of electrons that flow through the load and are accepted by the positive electrode. When the external load is removed, the reaction ceases.

A primary battery can convert its chemicals into electricity only once, and must then be discarded. The electrodes of a secondary battery, on the other hand, can be reconstituted by passing electricity back through the electrodes, and thus the secondary battery can be reused many times. Such secondary batteries are well known as storage or rechargeable batteries.

Photovoltaic systems convert light energy into electricity, and are most commonly known as □solar cells□. Solar cells are utilized in various applications, for example, to provide electricity for pumping water, power communications equipment, light homes and run some appliances. The efficiency of conventional solar cells is around 6%-14%.

One problem with such conventional solar cells is that they require crystalline polysilicon, the manufacturing of which is relatively expensive. Also, crystalline polysilicon only works when there is sunlight, and thus the solar powered device typically also must have a secondary battery to provide energy during evening hours. The half-life of photovoltaic systems is around 3 years.

A fuel cell is a device that converts the chemical energy from a fuel into electricity through a chemical reaction of positively charged hydrogen ions with oxygen or another oxidizing agent. Fuel cells are different from batteries in that they require a continuous source of fuel (i.e., hydrogen) and oxygen or air to sustain the chemical reaction. In contrast, in a battery, the chemicals present in the battery react with each other to generate an electromotive force (emf). Fuel cells can produce electricity continuously for as long as they are supplied with fuel and oxygen/air. In addition to electricity, fuel cells produce water, heat and, depending on the fuel source, very small amounts of nitrogen dioxide and other emissions. The energy efficiency of a fuel cell is generally between 40% and 60%.

One problem with fuel cells, however, is that a continuous source of hydrogen (i.e., fuel) is required.

Accordingly, it would be desirable to provide a solid-state battery that does not require recharging and which does not need to be connected to an energy source.

BRIEF DESCRIPTION OF SEVERAL VIEWS OF THE DRAWINGS

The foregoing summary, as well as the following detailed description of the invention, will be better understood when read in conjunction with the accompanying drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

All patents and publications referred to herein are incorporated by reference. Unless otherwise defined, all technical and scientific terms used herein have the same meaning as commonly understood to one of ordinary skill in the art to which this invention pertains. Otherwise, certain terms used herein have the meanings as set forth in the specification.

It must be noted that as used herein and in the appended claims, the singular forms □a,□ □an, □and □the □include plural references unless the context clearly dictates otherwise.

As used herein, the term □melanin material□ refers to melanin, melanin precursors, melanin derivatives, melanin analogs, and melanin variants including natural and synthetic melanin, eumelanin, pheomelanin, neuromelanin, polyhydroxyindole, alomelanin, humic acid, fulerens, graphite, polyindolequinones, acetylene black, pyrrole black, indole black, benzence black, thiophene black, aniline black, polyquinones in hydrated form, sepiomelanins, dopa black, dopamine black, adrenalin black, catechol black, 4-amine catechol black, in simple linear chain aliphatics or aromatics; or their precursors as phenols, aminophenols, or diphenols, indole polyphenols, quinones, semiquinones or hydroquinones, L-tyrosine, L-dopamine, morpholine, ortho-benzoquinone, dimorpholine, porphyrin black, pterin black, and ommochrome black.

As used herein, the term □inert material, □when used in reference to a material for embedding at least one melanin material, refers to any material that is compatible with melanin but will not chemically react with melanin. Preferably, the inert material is a material that does not dissolve in water. Examples of inert materials are silicon, silica, calcium, aluminum and polyethylene.

In one embodiment, the invention relates to a solar cell or photovoltaic cell (also known as a solar battery) which is an electrical device that converts the energy of light directly into electricity. The solar cell of the present invention works to produce hydrogen on its own.

Figure 1:
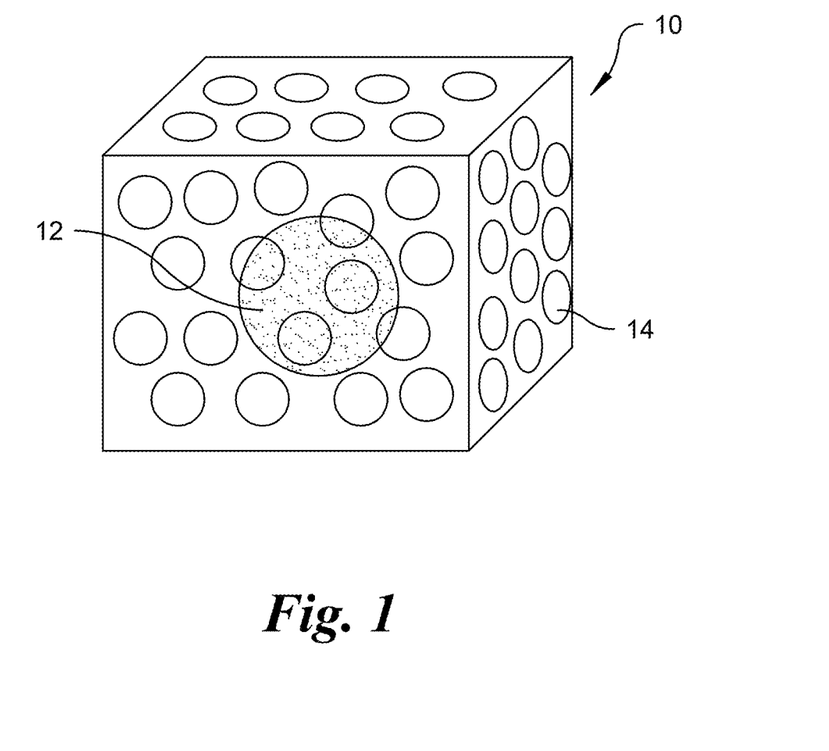
FIG. 1 is a perspective view a nanomaterial formed of a melanin material embedded in a block of inert material in accordance with an embodiment of the present invention.

The solar cell is comprised of a plurality of nanomaterials 10 of melanin. More particularly, each nanomaterial 10 comprises a melanin material 12 held on or embedded within an inert form 14, as shown in FIG. 1.

The intrinsic ability of melanin to absorb energy and utilize the absorbed energy to catalyze the electrolysis of water into hydrogen and oxygen was also recently discovered. In particular, it was found that upon splitting of the water molecule by melanin, the reverse reaction can occur, consequently reforming the water molecule and releasing energy. Thus, melanin absorbs all wavelengths of electromagnetic energy, including visible and invisible light energy, and dissipates this absorbed energy by means of water dissociation and its consequent reformation, thereby producing chemical energy. A photoelectrochemical process for generating energy using melanin, or analogs, precursors, derivatives, or variants of melanin is described in U.S. Pat. No. 8,455,145.

Melanin is ubiquitous in nature, and is composed of nitrogen, oxygen, hydrogen and carbon. For many years, melanin had no biological or physiological function attributed to it, other than it being considered a simple sunscreen with a low protection factor equivalent to that of a 2% copper sulfate solution. Melanin has also been considered the darkest molecule known because it is able to absorb energy of almost any wavelength, yet it did not seem to emit any energy. This was unique to melanin, and it contradicted thermodynamic laws because other compounds capable of absorbing energy, particularly pigments, emit a portion of the energy absorbed. The electronic properties of melanin have thus been the focus of attention for quite some time. However, melanin is one of the most stable compounds known to man and, for a long time, it seemed that melanin was unable to catalyze any chemical reaction.

Without wishing to be bound by any theories, for example, it is believed that the reaction inside melanin occurs according to the following Scheme I:

(I)

$$2H_2O + light \xrightleftharpoons{melanin} 2H_2 + O_2 + 4e^-$$

Upon the absorption of electromagnetic energy such as light energy (visible or invisible), melanin catalyzes the dissociation of water into diatomic hydrogen ($H_2$), diatomic oxygen ($O_2$), and electrons ($e^-$). Although the splitting of water into hydrogen and oxygen consumes energy, the reaction is reversible, and in the reverse process the reduction of oxygen atoms with diatomic hydrogen to reform the water molecules liberates energy, as discussed above.

Thus, melanin is able to transform light energy into chemical energy, analogous to the process by which plants use the pigment chlorophyll to transform light energy into chemical energy during photosynthesis. Therefore, by analogy, this process has been designated □human photosynthesis.□ However, an important distinction between the water splitting reaction carried out by melanin and that carried out by chlorophyll is that the water splitting reaction by chlorophyll can only occur in a living cell and with visible light having a wavelength in the range of 400 nm to 700 nm. In contrast, melanin can split and reform the water molecule outside of a living cell using any form of electromagnetic energy, particularly with light energy (visible or invisible) having a wavelength in the range of 200 nm to 900 nm to form $H_2$ and $O_2$.

Preferably, the melanin material 12 is embedded within the inert form 14 of each nanomaterial 10, such that the material of the inert form 14 serves as a barrier between the melanin material 12 and the immediate surroundings to preserve the physical and chemical integrity of the melanin material. Preferably, the inert form 14 is formed of a porous material. The pores are preferably sized so as to only allow the passage of water and gas therethrough.

In one embodiment, each nanomaterial 10 may include just one type or form of melanin material 12, or more than one type or form of melanin material 12.

According to embodiments of the invention, the at least one melanin material is selected from the group consisting of melanin, melanin precursors, melanin derivatives, melanin analogs, and melanin variants. In a preferred embodiment, the at least one melanin material is melanin, preferably natural melanin or synthetic melanin. Any method known in the art in view of the present disclosure can be used to obtain a melanin material. For example, melanin materials can be chemically synthesized or isolated from natural sources, such as plants and animals. Melanin can also be synthesized from amino acid precursors of melanin, such as L-tyrosine. The melanin material can also be obtained from commercial sources.

The inert form 14 of the nanomaterial 10 is preferably stable and non-reactive. For example, the material of the inert form 14 may be silicon, silica, calcium, aluminum, plastic (e.g., and polyethylene), glass, or any mixture thereof. Preferably, the inert form 14 is formed of a mixture of calcium, aluminum and silica, such that the nanomaterial 10 is a mixture of calcium, aluminum and silica with at least one melanin material 12 embedded therein.

In one embodiment, the melanin material 12 is preferably 1% to 3% by volume of the total volume of the nanomaterial 10. The amount of material of the inert form 14 in the nanomaterial 10 is preferably 91% to 99% by volume of the total volume of the nanomaterial 10, and more preferably 97% to 99% by volume.

The at least one melanin material 12 may be embedded in the inert form 14 by any known or yet to be developed appropriate measures. In one embodiment, the melanin material 12 is embedded in the inert form 14 by adhesion. In another embodiment, the melanin material 12 is embedded in the inert form 14 by compression.

The solution of melanin used to prepare each nanomaterial 10 preferably has a melanin concentration of 3 mg/ml. However, it will be understood that a lower melanin concentration or a higher melanin concentration (e.g., for use in areas of lesser sunlight) may be used as necessary to effect the desired about of light absorption. It will also be understood that the nanomaterials 10 may be made in any shape.

Figure 2:
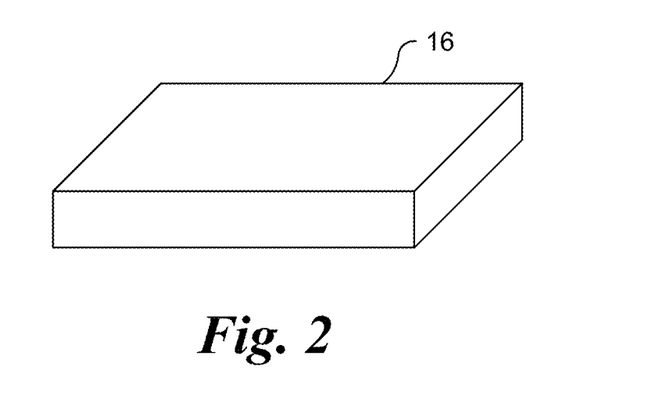
FIG. 2 is a perspective view of a body of a solid-state melanin battery formed of the nanomaterials shown in FIG. 1.

A melanin structure 16 is formed of a plurality (preferably thousands) of the nanomaterials 10, as shown in FIG. 2. The melanin structure 16 defines a body of the battery 20. According to embodiments of the invention, the melanin structure 16 can take on any size or shape, including, but not limited to, a rod (cylindrical), plate, sphere, or cube-shape.

The rate of diatomic hydrogen ($H_2$) production will depend upon a variety of factors and can be controlled by varying, for example, the size, shape and surface area of the nanomaterials 10 or melanin structure 16, the amount of melanin material in the nanomaterials 10, and/or number of nanomaterials 10 or melanin structures 16 present in the battery 20.

Figure 3:
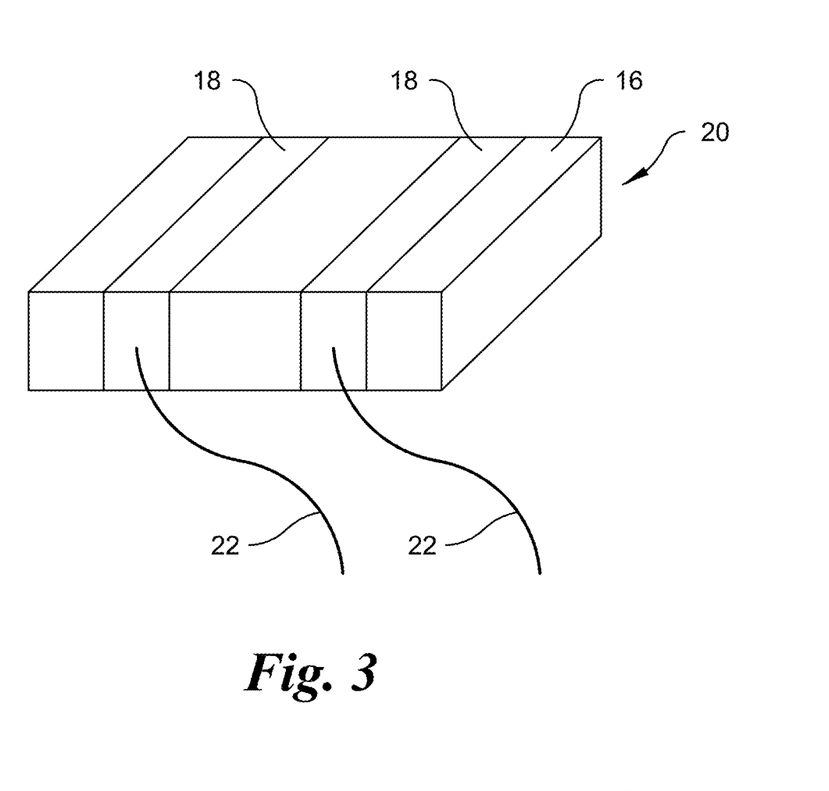
FIG. 3 is a perspective view of a solid-state melanin battery in accordance with an embodiment of the present invention.

Next, as shown in FIG. 3, in one embodiment, the melanin structure 16 is provided with at least first and second metal bands 18 which serve as first and second electrodes, respectively, to form the solid-state melanin battery 20. The metal bands 18 may be made of any suitable metal for forming an electrode. Preferably, the metal bands 18 are made of one or more of Ag, Al, Co, Au, or an alloy thereof. The metal bands 18 may all be made of the same metal or different metals. For example, the metal bands 18 may be formed of metal tape. Preferably, the metal bands 18 completely surround the melanin structure 16 (i.e., on both sides) and are firmly adhered thereto. However, it will be understood that the bands 18 may only partially surround the structure 16. Also, the metal bands 18 are preferably aligned with each other. The melanin battery 20 also includes a lead wire or metallic cable 22 attached or coupled to a respective electrode 18. In one embodiment, the wires 22 are of different colors.

In one embodiment, a viscous solution (not shown) containing electrolytes may be applied to the interface between the metal bands 18 and the nanomaterial melanin structure 16, in order to facilitate the travel of electrons from the nanomaterials 10 to the metal band 18. Alternatively, a material in the form of small graphite layers may be applied in the interface. It will be understood that any material which would facilitate an increase in voltage output may be used and applied in the interface between the electrodes 18 and the body 16 of the battery.

The output of the battery 20 depends on multiple factors, such as, for example, the size and composition of the battery 20, the nature of the electrodes 18, hours of use, temperature, pressure, etc.

In one embodiment, a battery 20 with dimensions of 12 cm×6 cm×7 cm was found to generate a direct current output of between 300 mv and 1.4 volts, and more preferably between 400 my and 1.4 volts, and an alternate current voltage of around 1.5 to 2.1 volts, preferably approximately 2 volts, and more preferably 1.9 volts. Thus, the battery 20 of the present invention has a unique electronic behavior, as it is capable of generating direct current and also alternate current.

Figure 4:
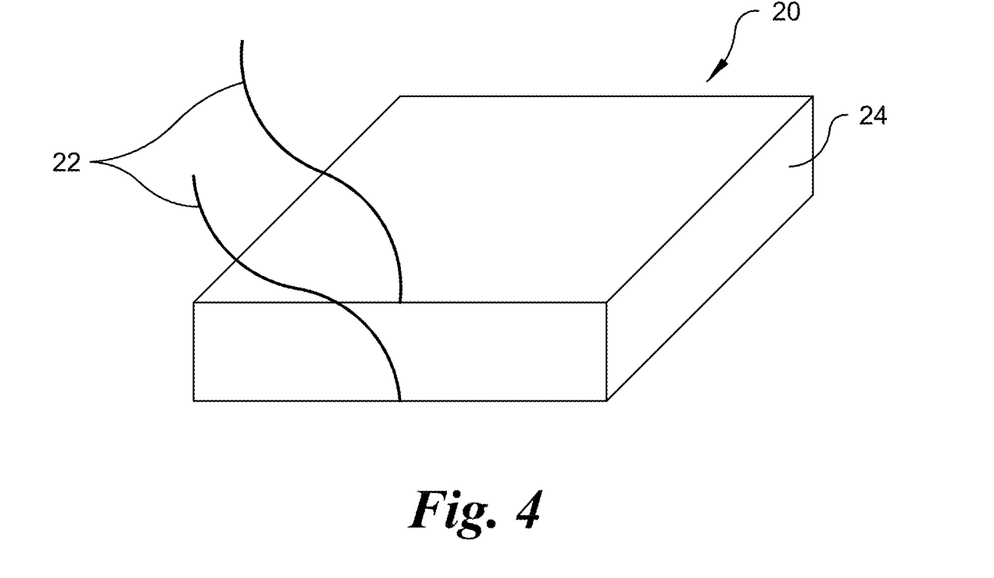
FIG. 4 is a perspective view of the solid-state melanin battery shown in FIG. 3, wrapped in an inert film.

As shown in FIG. 4, each battery 20 is preferably encased within an inert cover 24. Preferably, the inert cover 24 is formed of a plastic and transparent material. For example, the inert cover 24 may be formed of a high-density polyethylene. The metal wires 22 welded to the metal bands 18 are still allowed to protrude from, and more particularly through, the inert cover 24.

Figure 5:
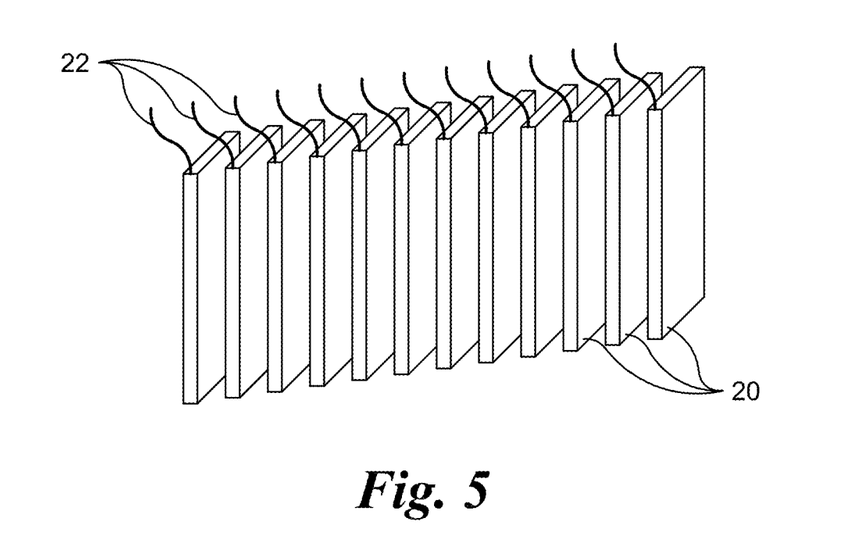
FIG. 5 is perspective view of a stack of the solid-state melanin batteries.

Accordingly, a plurality of batteries 20 may be stacked together, as shown in FIG. 5, in order to achieve a higher voltage output as desired.

Figure 6:
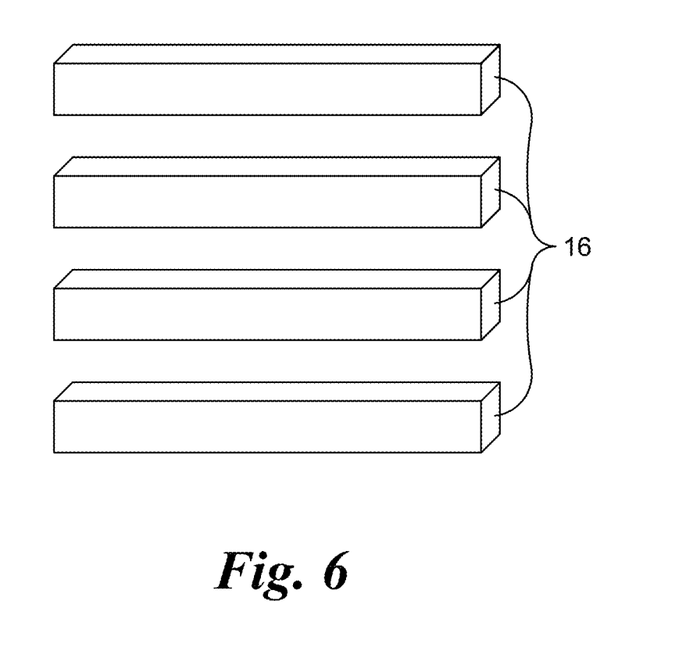
FIG. 6 is a perspective view of a stack of melanin structures.
Figure 7:
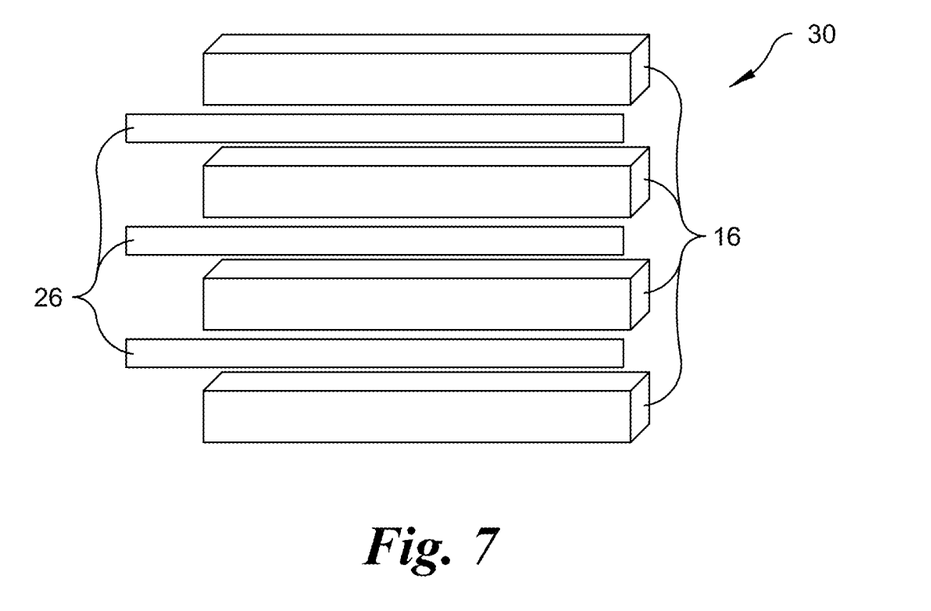
FIG. 7 is a perspective view of a battery formed of the melanin structure stack shown in FIG. 6, in accordance with an embodiment of the present invention.

In another embodiment, as shown in FIGS. 6-7, a plurality of melanin structures 16, optionally encased within the inert cover 24, are stacked together with at least one metal plate or substrate 26 positioned between each melanin structure 16, thereby forming a battery 30. The metal plates 26 function as electrodes. Each metal plate 26 may be made of the same metal or a different metal (e.g., one or more of Ag, Al, Co, Au, or an alloy thereof). In one embodiment, as shown in FIG. 7, the thin metal plates 26 cover the entire surface area of the adjacent melanin structure 16. The battery 30 preferably generates a direct current output of between 300 mV and 600 mV and an alternate current voltage of between 2 and 4 volts.

Figure 8:
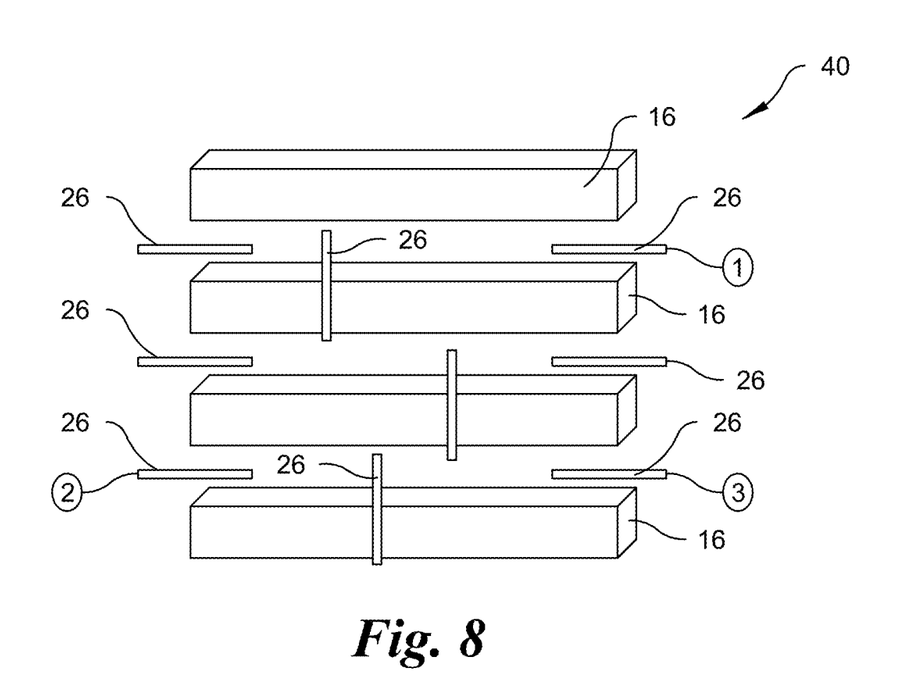
FIG. 8 is a perspective view of a battery formed of a stack of the melanin structures in accordance with an embodiment of the present invention.

In another embodiment, as shown in FIG. 8, a plurality of melanin structures 16, optionally encased within the inert cover 24, are stacked together with thin metal plates 26 therebetween, but the thin metal plates 26 do not cover the entire surface area of each adjacent melanin structure 16. Instead, a plurality of thin metal plates 26 are provided spaced apart from each other, and each metal plate 26 covers only a portion of the surface area of each adjacent melanin structure 16, thereby forming a battery 40. Again, each metal plate 26 may be made of the same metal or a different metal (e.g., one or more of Ag, Al, Co, Au), and functions as an electrode.

It will be understood that the dimensions of the melanin structures 16 and the metal plates 26 may be set as necessary to achieve the desired voltage output. In one example, each melanin structure 16 has a length of approximately 3 to 10 cm (preferably 10 cm), a width of approximately 2 to 5 cm (preferably 5 cm) and a thickness of approximately 15 mm. In one example, each metal plate 26 has a length of approximately 3 to 10 cm, a width of approximately 2 to 5 cm, and a thickness of approximately 100 μm. For example, the lengths and widths of the melanin structures 16 and metal plates 26 may be the same.

Depending on how the electrodes 26 are connected, the voltage output of the battery 40 may be varied. For example, if the electrodes 26 are ☐1 ☐and ☐2 ☐ are connected, the battery 40 generates a direct current output of between 300 mV and 600 mV and an alternate current voltage of between 2 to 4 volts. If, however, the electrodes marked ☐1 ☐and ☐3 ☐are connected, the battery 40 generates a direct current output of between 0.6 V and 1.2 V and an alternate current voltage of between 12 and 25 volts.

Figure 9:
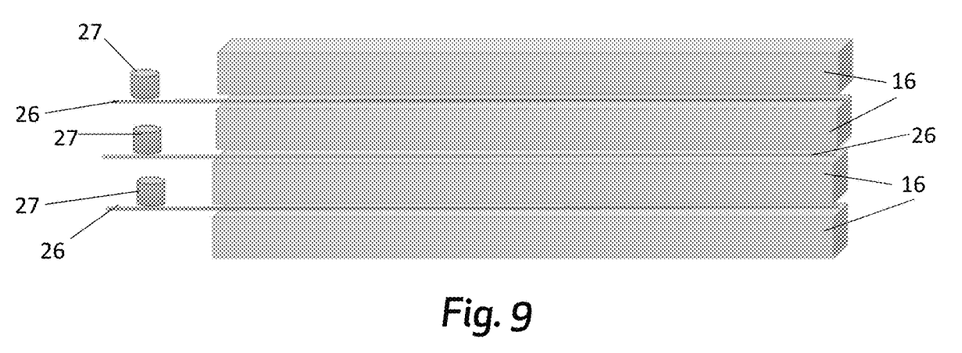
FIG. 9 is a perspective view of a battery formed of the melanin structure stack shown in FIG. 6, in accordance with another embodiment of the present invention.

In one embodiment, as shown in FIG. 9, the metal plates 26 are provided with magnetic material, and more particularly one or more magnets 27. For example, a magnet 27 may be positioned on an outer surface of each metal plate 26 positioned between the melanin structures 16. Preferably, the magnets 27 are made of neodymium, but it will be understood that any material of sufficient magnetic power may be used. In one embodiment, each magnet 27 has a generally cylindrical shape. In one embodiment, each cylindrical magnet 27 has a height of 5 mm and a diameter of 5 mm.

The inclusion of such magnets 27 increases the voltage produced by the battery 20, 30, 40. For example, the alternate current voltage may be increased by approximately 3 to 40 volts, and more preferably 20 to 25 volts. In particular, where the metal plates 26 are formed of copper and neodymium magnets 27 are used, the alternate current voltage is increased by approximately 3 volts. Where the metal plates 26 are formed of aluminum and neodymium magnets 27 are used, the alternate current voltage is increased by approximately 40 volts.

An advantage of the batteries 20 based on solid-state melanin is that the batteries 20 are very manageable, without risk of spillage (although melanin is not toxic). Given that melanin absorbs any kind of power and dissipates it separating the water molecule, the batteries 20 of the invention do not need to be recharged in any way and it is not necessary to connect them to a power supply source. Also, the melanin structures 16 preferably do not experience any increase in temperature.

Figure 10:
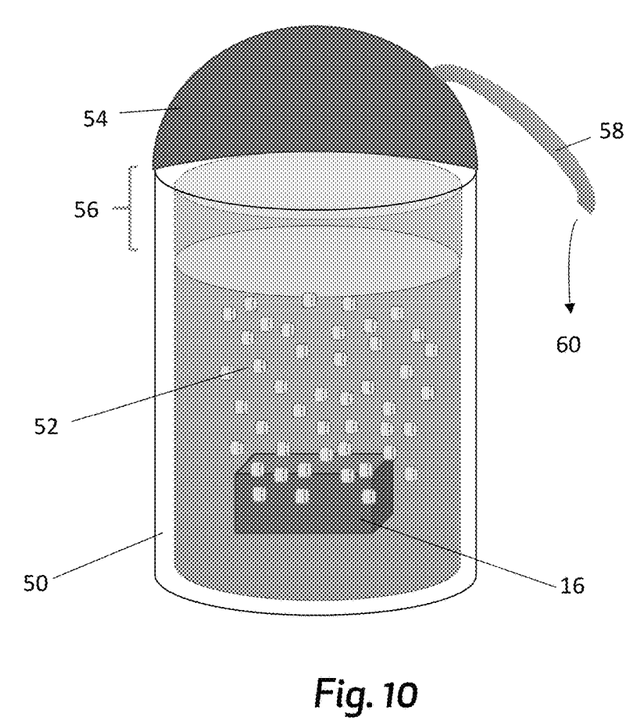
FIG. 10 is a side view showing an assembly for production of hydrogen and oxygen gas using a melanin structure, in accordance with an embodiment of the present invention.

In another embodiment, as shown in FIG. 10, each melanin structure 16 has a high concentration of melanin, preferably from 3 to 30% by weight melanin. When such a melanin structure 16 is immersed in water, a strong flow 52 of hydrogen and oxygen is obtained from the melanin structure 16, because melanin catalyzes the dissociation of water as described above. Specifically, a high concentration melanin structure 16 is placed in a container 50 filled with water. The container may be made of any known inert material, such as an inert glass or inert plastic. By the dissociation of water catalyzed by the melanin structure 16, bubbles 52 of hydrogen and oxygen are formed. For example, by this method and system, a 50 mL container is filled with hydrogen and oxygen bubbles in 30 minutes.

Preferably, the container 50 is equipped with a lid 54 to seal off the container 50 from the surrounding environment. Preferably, the container 50 is filled with such a level of water that a headspace 56 is present between the water level surface and the lid 54. The headspace 56 serves as a storage space within the container 50 for the hydrogen and oxygen bubbles. In one embodiment, the lid 54 is equipped with a pipe or other conduit 58. One end of the conduit 58 is in communication with the interior of the container 50, while the other end of the conduit 58 is in communication with a storage device, fuel cell, or any other component 60 which may utilize a supply of hydrogen and oxygen gases.

It will be appreciated by those skilled in the art that changes could be made to the embodiments and examples described above without departing from the broad inventive concept thereof. It is understood, therefore, that this invention is not limited to the particular embodiments disclosed, but it is intended to cover modifications within the spirit and scope of the invention as defined by the appended claims.

I claim:

1. A solid-state battery comprising:
    a melanin structure formed of at least one melanin material embedded in an inert material; and
    a first metal electrode and a second metal electrode, respectively,
        wherein the melanin material is selected from the group consisting of melanin, melanin precursors, melanin derivatives, melanin analogs and melanin variants; and
        wherein the solid-state battery does not need to be recharged or reloaded.

2. The solid-state battery according to claim 1, wherein a plurality of the solid-state batteries are stacked upon one another to form a battery assembly, the number of solid-state batteries depending upon the voltage required.

3. The solid-state battery according to claim 1, wherein the solid-state battery generates direct current voltage and alternate current voltage, and wherein the solid-state battery can be driven with electronic circuitry.

4. The solid-state battery according to claim 1, wherein the inert material is a porous material.

5. The solid-state battery according to claim 1, wherein the inert material is formed of one or more materials selected from the group consisting of silicon, silica, calcium, aluminum, plastic and glass.

6. The solid-state battery according to claim 5, wherein the inert material is formed of a mixture of calcium, aluminum and silica.

7. The solid-state battery according to claim 1, wherein the first and second metal electrodes are made of one or more metals selected from the group consisting of Ag, Al, Co, Au and an alloy thereof.

8. A high voltage battery stack comprising:
a plurality of solid-state melanin structures, each solid-state melanin structure being formed of at least one melanin material embedded in an inert material; and
a metal electrode positioned between each solid-state melanin structure,
wherein the melanin material is selected from the group consisting of melanin, melanin precursors, melanin derivatives, melanin analogs and melanin variants; and
wherein the high voltage battery stack does not need to be recharged or reloaded.

9. The high voltage battery stack according to claim 8, wherein the inert material is a porous material.

10. The high voltage battery stack according to claim 8, wherein the inert material is formed of one or more materials selected from the group consisting of silicon, silica, calcium, aluminum, plastic and glass.

11. The high voltage battery stack according to claim 10, wherein the inert material is formed of a mixture of calcium, aluminum and silica.

12. The high voltage battery stack according to claim 8, wherein each metal electrode is made of one or more metals selected from the group consisting of Ag, Al, Co, Au and an alloy thereof.

13. The high voltage battery stack according to claim 8, wherein each solid-state melanin structure is encased within an inert cover.

14. The high voltage battery stack according to claim 8, wherein each electrode includes a magnet.

15. The high voltage battery stack according to claim 14, wherein each magnet is a neodymium magnet.

* * * * *